United States Patent [19]

Forster et al.

[11] Patent Number: 5,472,636
[45] Date of Patent: Dec. 5, 1995

[54] METHOD OF PREPARING MANGANESE AND LEAD COACTIVATED CALCIUM SILICATE PHOSPHOR

[75] Inventors: Cheryl M. Forster, Van Etten, N.Y.; Anthony F. Kasenga, Towanda, Pa.

[73] Assignee: Osram Sylvania Inc., Danvers, Mass.

[21] Appl. No.: 306,080

[22] Filed: Sep. 14, 1994

[51] Int. Cl.$^6$ .................................................. C09K 11/59
[52] U.S. Cl. .................................. 252/301.4 F; 423/331
[58] Field of Search ......................... 252/301.47; 423/331

[56] References Cited

U.S. PATENT DOCUMENTS

| | | | |
|---|---|---|---|
| 2,299,510 | 10/1942 | Steadman | 250/81 |
| 2,474,193 | 6/1949 | Schulman | 252/301.4 |
| 2,497,140 | 2/1950 | Schulman | 252/301.6 |
| 2,525,028 | 10/1950 | Froelich | 252/301.6 |
| 2,542,322 | 2/1951 | Froelich | 252/301.4 |
| 2,542,349 | 2/1951 | Ouweltjes | 252/301.4 |
| 5,207,948 | 5/1993 | Wolfe et al. | 252/301.36 |
| 5,234,625 | 8/1993 | Forster | 252/301.4 |

*Primary Examiner*—C. Melissa Bonner
*Attorney, Agent, or Firm*—Robert F. Clark

[57] ABSTRACT

A process for producing a manganese and lead activated calcium metasilicate phosphor having the nominal formula $CaSiO_3:MN:Pb$. The process involves preparing a uniform aqueous dispersion of fumed silica having an ultrafine average particle size of less than 50 nm, a calcium precursor, a manganese precursor, and a lead precursor. Preferably, the calcium, manganese, and lead precursors are added as powders to an aqueous dispersion of said ultrafine fumed silica. The ultrafine fumed silica aqueous dispersion is heated to a temperature of about 50°–90° C. and the powders are mechanically dispersed in the fumed silica aqueous dispersion to form the uniform aqueous dispersion. The molar ratio of calcium:silicon in the mixture is approximately stoichiometric to 1.3:1; and the molar ratios of manganese and lead in the dispersion are sufficient to activate the phosphor. The precipitate from the dispersion is calcined at a temperature of about 1050°–1135° C. for a time sufficient to form a manganese and lead activated calcium silicate phosphor having a peak emission in the red region of the visible spectrum when stimulated by external radiation at approximately 254 nm. The phosphor product has an average primary particle size of less than 5 μm and a brightness at least equivalent to that of commercially available manganese and lead activated calcium silicate phosphors.

14 Claims, No Drawings

METHOD OF PREPARING MANGANESE AND LEAD COACTIVATED CALCIUM SILICATE PHOSPHOR

CROSS-REFERENCE TO RELATED APPLICATIONS

The present application contains subject matter related to U.S. application Ser. No. 08/306,046, commonly assigned and filed concurrently herewith.

BACKGROUND OF THE INVENTION

The present invention relates to fluorescent lamp phosphors, and particularly relates to a method of preparing a manganese and lead coactivated calcium metasilicate phosphor and the phosphor produced thereby.

Manganese and lead coactivated calcium silicate phosphors emitting in the red region of the visible spectrum are used, for example, in fluorescent lamps and cathode ray tubes. The phosphor, however, is difficult to manufacture because the Ca-Si-Mn-Pb combination is a slowly reacting system. Such reactivity depends on efficient and complete incorporation of the dopant concentration levels of the manganese and lead ions used in the phosphor. Some processes have used an excess quantity of silica in the starting formulation to assist reactivity. However, unreacted components in a phosphor can be detrimental to the light output of a lamp, although an excess amount of unreacted silica is less detrimental than excess metal compounds because of the metal oxide's greater absorption of ultraviolet radiation. Other processes use additives, for example, metal halides to facilitate a complete reaction. Using additives to assist the reaction, however, can increase the particle size of the product under extended firing conditions and can lead to undesirable loss of lead to the environment.

In another context, prior art processes for making calcium silicate phosphors, for example those using silicic acid as a silicon source, produce phosphors of excessively large primary (pre-milling) particle size. such phosphors require extensive milling to achieve the desired final particle size. However, such extensive milling alters the surface characteristics of the phosphor crystals, decreasing the brightness of the phosphor.

In yet another context, prior art processes have used lead halide or lead oxide compounds as the lead source in a vapor state reaction with the $CaSiO_3$:Mn. Alternatively, lead fluoride has been added as a powder to the starting formulation for a solid state reaction. However, use of the simple lead halide or oxide compounds requires extensive precautions to prevent release of lead into the environment during the phosphor synthesis process.

It would be desirable to have a red emitting manganese and lead activated calcium silicate phosphor exhibiting a particle size of less than 5 μm without significant loss of lamp brightness. Also desirable would be a process that eases the environmental precautions required during the firing procedure. The phosphor and process described herein were developed to address these needs.

OBJECTS OF THE INVENTION

Accordingly, it is an object of this invention to provide a process for producing a manganese and lead activated calcium metasilicate exhibiting improved lamp brightness after milling to less than 5 μm.

It is another object of this invention to provide a process for producing a manganese and lead activated calcium metasilicate exhibiting improved lamp brightness, the process requiring less extensive environmental precautions than prior art processes.

It is yet another object of this invention to provide a process for producing a manganese and lead activated calcium metasilicate phosphor by calcining the precipitate from a uniform aqueous dispersion of ultrafine particle sized fumed silica, a calcium precursor, a manganese precursor, and a lead precursor.

SUMMARY OF THE INVENTION

In one aspect, the invention is a process for producing a manganese and lead activated calcium metasilicate phosphor having the nominal formula $CaSiO_3$:Mn:Pb. The process involves preparing a uniform aqueous dispersion of fumed silica having an ultrafine average particle size of less than 50 nm, a calcium precursor, a manganese precursor, and a lead precursor. The molar ratio of calcium:silicon in the mixture is approximately stoichiometric to 1.3:1; and the molar ratios of manganese and lead in the dispersion are sufficient to activate the phosphor. The precipitate from the dispersion is calcined at a temperature of about 1050°–1135° C. for a time sufficient to form a manganese and lead activated calcium silicate phosphor having a peak emission in the red region of the visible spectrum when stimulated by external radiation at approximately 254 nm. In a narrower aspect, the calcium, manganese, and lead precursors are added as powders to an aqueous dispersion of said ultrafine fumed silica. The ultrafine fumed silica aqueous dispersion is heated to a temperature of about 50°–90° C., and the powders are mechanically dispersed in the fumed silica aqueous dispersion to form the uniform aqueous dispersion.

In another aspect, the invention is a manganese and lead activated calcium silicate phosphor having the nominal formula $CaSiO_3$:Mn:Pb and a peak emission in the red region of the visible spectrum when stimulated by external radiation at approximately 254 nm. The phosphor has an average primary particle size of less than 5 μm and a brightness at least equivalent to that of commercially available manganese and lead activated calcium silicate phosphors.

DETAILED DESCRIPTION OF THE PREFERRED EMBODIMENTS.

An exemplary embodiment of the method in accordance with the invention involves the use of a fumed silica having an ultrafine particle size, typically 10–50 nm, as the silicon source in the starting formulation. Preferably, the ultrafine fumed silica is electrostatically dispersed in an aqueous medium before addition of the remaining components of the starting formulation. Such a dispersion is commercially available as Cab-o-sperse A105 or A1095 solution, available from Cabot Corporation, Tuscola, Ill.; Nyacol 2050, 2034DI, 2040, or 2040NH4 colloidal silica sols, available from PQ Corporation, Valley Forge, Pa.; or Ludox AM colloidal silica liquid, available from E. I. dupont de Nemours & Co., Inc., Wilmington, Del. This silica starting material has been found to change the reactivity of the calcium silicate starting components to enable synthesis of a calcium silicate phosphor with good plaque brightness and a much smaller average primary particle size, less than 5 μm. The small size of the primary particles enables engineering of the particle size and morphology to optimize lamp output.

Into this dispersion of ultrafine silica are admixed compounds providing the calcium, manganese, and lead components of the phosphor. For example, calcium carbonate and fluoride, manganese carbonate or difluoride, and lead oxide or fluoride powders may be stirred into the dispersion. However, the preferred lead source for the process described herein is a lead carbonate, for example, lead carbonate hydroxide ($Pb_3(CO_3)_2(OH)_2$), commonly known as "white lead" added as a powder to the starting formulation.

Typically, the dispersion is diluted with deionized water before addition of the powders, then heated, for example to 50°–90° C., typically about 70° C. and stirred to promote intimate mixing of the added components with the silica in the dispersion. Because of the ultrafine particle size of the silica component, a more intimate contact is achieved in the dispersion or admixture with each particle of the metal containing components.

The dispersion may then be filtered to separate out the solid components, dried, and deagglomerated to provide a phosphor precursor powder. Ammonium bifluoride may be added to the dispersion to aid the filtering process. Typically, the filtrate is dried for at least 6 hr, e.g. about 15 hr, in a drying oven at about 110° C. Agglomerates in the precursor powder may be mechanically broken up using glass media in a shaking apparatus.

The precursor powder is then fired or calcined in an oxidizing atmosphere to produce the phosphor. For example, the calcining may be carried out in a single firing or multiple firings in air in a closed silica crucible at about 1050°–1135° C., preferably below about 1100° C. with slow heating and cooling rates, for a total firing time over 500° C. of about 15–30 hr. After cooling, the fired cake is broken up by gentle comminution, and may be washed with citric acid to sequester any unreacted manganese ions, which can discolor the phosphor. It has been found that reactivity of the components is significantly improved by the more intimate contact provided by the ultrafine silica component.

The following Examples are presented to enable those skilled in the art to more clearly understand and practice the present invention. These Examples should not be considered as a limitation upon the scope of the present invention, but merely as being illustrative and representative thereof.

EXAMPLE 1

A manganese and lead activated calcium silicate phosphor was produced using white lead as the lead source. A dispersion was prepared having the following component mole ratios:

1.0–1.2 $SiO_2$ (Cab-o-sperse)
0.0065 $CaF_2$
0.9935 $CaCO_3$
0.06645 $MnCO_3$
0.0022 $pB_3(CO_3)_2(OH)_2$
0.0020 $NH_4F$.

The white lead is available from Hammond Lead Products, Inc., Pittsburgh, Pa. The calcium fluoride is available from J. T. Baker Chemical Co., Phillipsburg, N.J. The calcium carbonate is available from Aldrich Chemical Co., Milwaukee, Wis. The ammonium fluoride is available from Fisher Scientific, Fair Lawn, N.J.

The component powders were added to the silica dispersion, and the admixture was heated to about 70° C.±20° C. and stirred until well blended. The precipitate was filtered out and dried. The resulting powder was mechanically deagglomerated in a paint shaker using glass media.

The resulting precursor powder was calcined in air in accordance with the following firing schedule:
First firing:
Slow heating- 3 hr from 500°–1079° C.
Calcining- held at 1079° C. for 6 hr
Slow cooling- 2 hr from 1079°–500° C.
Second firing:
Slow heating- 3 hr from 500°–1135° C.
Calcining- held at 1135° C. for 6 hr
Slow cooling- 2 hr from 1135°–500° C.
Third firing:
Heating- 1 hr from 500°–1079° C.
Calcining- held at 1079° C. for 3 hr
Cooling- 1 hr from 1079°–500° C.

After the first firing, 4 weight % $CaCl_2$ was added to the phosphor powder. After each firing, the fired cake was gently comminuted, and the finished phosphor was washed with citric acid to sequester unreacted Mn ions.

EXAMPLE 2

A manganese and lead activated calcium silicate phosphor was produced using lead oxide as the lead source. A dispersion was prepared as described in Example 1, but having the following component mole ratios:

1.1–1.3 $SiO_2$ (Cab-o-sperse)
0.0065 $CaF_2$
0.9935 $CaCO_3$
0.06645 $MnCO_3$
0.0065 PbO
0.0020 $NH_4F$.

The lead oxide is available from Performance Chemicals and Reagents, Inc., Easton, Pa.

The resulting precursor powder was calcined in air in accordance with the following firing schedule:
Slow heating- 3 hr from 500°–1079° C.
First step- held at 1079° C. for 6 hr
Slow heating- 2 hr from 1079°–1135° C.
Second step- held at 1135° C. for 6 hr
Slow cooling- 2 hr from 1135°–500° C.

After each firing, the fired cake was gently comminuted, and the finished phosphor was washed with citric acid to sequester unreacted Mn ions.

EXAMPLE 3

A manganese and lead activated calcium silicate phosphor was produced using lead fluoride as the lead source. A dispersion was prepared as described in Example 1, but having the following component mole ratios:

1.1–1.3 $SiO_2$ (Cab-o-sperse)
1.0 $CaCO_3$
0.06645 $MnCO_3$
0.0065 $PbF_2$
0.0020 $NH_4F$.

The lead fluoride was produced by Osram Sylvania Incorporated, Chemical & Metallurgical Division, Towanda, Pa.

The resulting precursor powder was calcined in air in accordance with the following firing schedule:
Slow heating- 3 hr from 500°–1079° C.
First step- held at 1079° C. for 6 hr
Slow heating- 2 hr from 1079°–1135° C.

Second step- held at 1135° C. for 6 hr
Slow cooling- 2 hr from 1135°–500° C.
After each firing, the fired cake was gently comminuted, and the finished phosphor was washed with citric acid to sequester unreacted Mn ions.

The phosphors in Examples 1–3 exhibited fine primary particle size and excellent brightness. Extensive milling was not required to achieve the desired phosphor particle size. The aggregated particle size after gentle comminution was measured by the Coulter Counter method to be less than 15 μm. However, the size of the primary particles making up the aggregated particles, as examined by scanning electron microscope, was less than 5 μm.

The Table below compares the plaque brightness of samples from Examples 1, 2, and 3 to a commercially available calcium silicate phosphor (Type 290, available from Osram Sylvania Incorporated, Danvets, Mass.). Sylvania Type 290 phosphor is synthesized from a solid state reaction of silicic acid with calcium, manganese, and lead compounds in accordance with standard commercial production practices. Sample 1 was formulated using white lead, with calcium chloride added after the first of three firings, as described in Example 1. Sample 2 was formulated using lead oxide and a one-step firing without the addition of calcium chloride, as described in Example 2. Sample 3 was formulated using lead fluoride without calcium chloride addition, and a one-step firing. Also compared in the Table are the color coordinates, luminance, Coulter Counter particle size (which includes remaining aggregates in its determination), and bulk chemical composition by X-ray fluorescence of samples from Examples 1, 2, and 3.

The use of white lead in the formulation of Sample 1 reduced the lead emissions from the calcining process. It is theorized that the more complex chemical structure of the white lead as compared to the oxide, and presumably to the fluoride, and the difference between the low decomposition temperature of the white lead (290°–420° C.) and the high melting point of the lead oxide (888° C.) or the lead fluoride (824° C.) alters the mechanism of lead incorporation into the calcium silicate phosphor. As may be seen in the Table, the use of white lead in Sample 1 appears to increase the reactivity between the components, the presence of the carbonate and hydroxyl ions helping to promote reactivity of the components. Sample 2, with lead derived from the oxide, and Sample 3, with lead derived from the fluoride, require an excess of silica (at least about 1.1 Si/Ca) to produce a relative brightness comparable to that of Sample 1 (as little as 1.0 Si/Ca). Synthesis of the above-described Sylvania Type 290 commercially available phosphor requires an even greater excess (at least 1.25 Si/Ca) of a silicon source, silicic acid, than synthesis of Samples 2 and 3.

The efficiency of the reaction can be attributed to the fine particle size and homogeneity of the dispersed silica starting material. The more intimate mixture of starting materials on an atomic level results in enhanced reactivity, thus there is less need for an excess of silicon in the starting components. The Table below indicates that an excess of silica is present in the final phosphor product of the reactions. The excess silicon exists in the species $SiO_2$ and can be detrimental to lamp output. Normally, only a stoichiometric amount of the ultrafine dispersed silica in the starting formulation is required when white lead is used as the silica source, and only a slight excess when the lead oxide or fluoride is used.

The Table also indicates a progressive decrease of bulk lead with an increase of firing steps, i.e. from Samples 2 and 3 to Sample 1. The input weight % lead was the same in all three samples, 1.13 weight %. The single fired Sample 3 retained 71% of the lead from the lead fluoride component. Sample 2, with a single firing, retained 33% of the lead from its lead oxide component. Triple fired Sample 1 retained only 16% of the lead from its white lead component. Since lead is known to be volatile, a difference in lead loss to the atmosphere with increasing firing time and temperature is not unexpected. The similar brightness achieved in the three samples, in spite of the differences in the amount of lead retained, was also not unexpected. It has been found that there is a broad range of retained lead content that will give equally bright phosphors. Concentrations above and below this range will give inferior phosphors. If the concentration of lead is too low, the lead will not absorb sufficient 254 nm incident radiation to transfer effectively to a manganese emitter. If the lead concentration is too high, concentration quenching results.

TABLE

|  | Sample 1 | Sample 2 | Sample 3 |
|---|---|---|---|
| Rel. Brtns.* | 104% | 100.1% | 101.5% |
| Color Coord., x/y | 0.587/0.414 | 0.574/0.411 | 0.575/0.409 |
| Lumnce., fL | 22.38 | 21.36 | 21.67 |
| Cltr. Ctr., 50% (sonic) | 10.68 μm | 13.73 μm | 12.44 μm |
| Bulk Analysis, Si:Ca | 1.33:1 | 1.57:1 | 1.49:1 |
| Atomic % Si | 1.18 | 1.38 | 1.34 |
| Atomic % Ca | 0.89 | 0.88 | 0.90 |
| Weight % Mn | 2.47 | 2.56 | 2.60 |
| Weight % Pb | 0.18 | 0.37 | 0.80 |

*As compared to Sylvania Type 290.

Additional firing of samples from Examples 2 and 3 resulted in loss of plaque brightness. Less firing of samples from Example 1 also produced a phosphor of reduced plaque brightness. It appears that the firing schedule selected for optimum plaque brightness will depend on the starting formulation, e.g. the lead source. The optimum schedule may be empirically determined.

Environmental considerations would recommend incorporation of the lowest amount of lead consistent with production of a phosphor of optimum brightness. The synergistic action of white lead as the lead source, ultrafine fumed silica dispersion as the silica source, and slow heat treatment appears to promote effective incorporation of the lead into the calcium silicate host structure, producing a bright phosphor with the lowest final bulk lead content. Thus, a single firing of a composition similar to that of Example 1, but with a reduced lead input, would ease the environmental precautions required by prior art processes. Also, only a stoichiometric amount of silica is required when the ultrafine fumed silica dispersion described herein is used as the silica source.

The invention described herein presents to the art a novel, improved phosphor and a method for producing the phosphor utilizing an ultrafine silica component in the starting formulation. The process has been found to produce a red emitting manganese and lead coactivated calcium silicate phosphor exhibiting a primary particle size of less than 5 μm without significant loss of plaque brightness. Only stoichiometric quantities of the starting components are required to produce good brightness. The phosphor does not require extensive milling to achieve its fine particle size, thus avoiding loss of brightness due to the vigorous milling step required for prior art phosphors. The small size of the primary particles enables engineering of the particle size and morphology to optimize lamp output. Also, the lower temperatures and shorter time for the calcining of the phosphor, as well as the use of white lead as the lead source, reduce the loss to the environment of volatile components, thus easing the environmental precautions necessary with prior art methods.

While there has been shown and described what are at present considered the preferred embodiments of the invention, it will be apparent to those skilled in the art that modifications and changes can be made therein without departing from the scope of the present invention as defined by the appended Claims.

We claim:

1. A process for producing a manganese and lead activated calcium metasilicate phosphor having the nominal formula $CaSiO_3$:Mn:Pb, said process comprising the steps of:

preparing a uniform aqueous dispersion comprising fumed silica having an ultrafine average particle size of less than 50 nm, a calcium precursor, a manganese precursor, and a lead precursor, the molar ratio of calcium:silicon in said mixture being approximately stoichiometric to 1.3:1, and the molar ratios of manganese and lead in said dispersion being sufficient to activate said phosphor; and calcining precipitate from said dispersion at a temperature of about 1050°–1135° C. for a time sufficient to form a manganese and lead activated calcium silicate phosphor having a peak emission in the red region of the visible spectrum when stimulated by external radiation at approximately 254 nm.

2. A process in accordance with claim 1 wherein said step of preparing said uniform aqueous dispersion comprises adding said calcium, manganese, and lead precursors as powders to an aqueous dispersion of said ultrafine fumed silica.

3. A process in accordance with claim 2 further comprising the steps of heating said ultrafine fumed silica aqueous dispersion to a temperature of about 50°–90° C.; and mechanically dispersing said powders in said fumed silica aqueous dispersion to form said uniform aqueous dispersion.

4. A process in accordance with claim 1 wherein said calcining step is carried out in an oxidizing atmosphere.

5. A process in accordance with claim 4 further comprising the steps, after said calcining step, of milling said phosphor; and performing a second calcining of said milled phosphor in an oxidizing atmosphere at a temperature of about 1050°–1135° C. for a time sufficient to form an improved manganese and lead activated calcium silicate phosphor having improved brightness relative to the product of said calcining step.

6. A process in accordance with claim 5 further comprising the step, before said second calcining step, of mixing calcium chloride with said phosphor in an amount sufficient to achieve said improved brightness.

7. A process in accordance with claim 6 further comprising the steps, after said second calcining step, of milling said phosphor; and performing an additional calcining of said milled phosphor in an oxidizing atmosphere at a temperature of about 1050°–1135° C. for a time sufficient to form a further improved manganese and lead activated calcium silicate phosphor having further improved brightness relative to the product of said second calcining step.

8. A process in accordance with claim 1 wherein said calcium precursor comprises calcium carbonate or a combination of calcium carbonate and calcium fluoride.

9. A process in accordance with claim 1 wherein said manganese precursor substantially comprises manganese carbonate or manganese difluoride.

10. A process in accordance with claim 1 wherein said lead precursor substantially comprises one or more compounds selected from the group consisting of lead carbonate, lead oxide, and lead fluoride.

11. A process in accordance with claim 10 wherein said lead precursor substantially comprises lead carbonate/hydroxide.

12. A process in accordance with claim 1 wherein said uniform aqueous dispersion further comprises ammonium fluoride as a reaction aid.

13. A process for producing a manganese and lead activated calcium metasilicate phosphor having the nominal formula $CaSiO_3$:Mn:Pb, said process comprising the steps of:

adding a calcium precursor, a manganese precursor, and a lead precursor as powders to an aqueous dispersion of fumed silica having an ultrafine average particle size of less than 50 nm, the molar ratio of calcium:silicon in said mixture being approximately stoichiometric, and the molar ratios of manganese and lead in said dispersion being sufficient to activate said phosphor;

heating said ultrafine fumed silica aqueous dispersion to a temperature of about 50°–90° C.;

mechanically dispersing said powders in said fumed silica aqueous dispersion;

calcining precipitate from said dispersion in an oxidizing atmosphere at a temperature of about 1050°–1135° C. for a time sufficient to form a manganese and lead activated calcium silicate phosphor having a peak emission in the red region of the visible spectrum when stimulated by external radiation at approximately 254 nm;

milling said phosphor; and performing a second calcining of said milled phosphor in an oxidizing atmosphere at a temperature of about 1050°–1135° C. for a time sufficient to form an improved manganese and lead activated calcium silicate phosphor having improved brightness relative to the product of said calcining step.

14. A manganese and lead activated calcium silicate phosphor having the nominal formula $CaSiO_3$:Mn:Pb and a peak emission in the red region of the visible spectrum when stimulated by external radiation at approximately 254 nm, said phosphor having an average primary particle size of less than 5 μm and a brightness at least equivalent to that of commercially available manganese and lead activated calcium silicate phosphors.

* * * * *